United States Patent [19]

Chung et al.

[11] Patent Number: 4,539,354
[45] Date of Patent: Sep. 3, 1985

[54] STABILIZED ETHYLENE/CHLOROTRIFLUOROETHYLENE COPOLYMER COMPOSITION

[75] Inventors: Daniel C. Chung, Bridgewater; Swayambu Chandrasekaran, Mountain Lakes, both of N.J.

[73] Assignee: Allied Corporation, Morris Township, Morris County, N.J.

[21] Appl. No.: 280,730

[22] Filed: Jul. 6, 1981

[51] Int. Cl.$^3$ .................................................. C08K 5/52
[52] U.S. Cl. ...................................... 524/128; 524/291; 524/399
[58] Field of Search ................ 260/45.85 B, 45.7 PH, 260/45.95 D, 23 XA; 524/128, 399, 291

[56] References Cited

U.S. PATENT DOCUMENTS

| | | | |
|---|---|---|---|
| 2,564,646 | 8/1951 | Leistner et al. | 260/45.7 PH |
| 3,244,650 | 4/1966 | Hecker et al. | 260/23 H |
| 3,255,136 | 6/1966 | Hecker et al. | 260/23 H |
| 3,285,855 | 11/1966 | Dexter et al. | 260/45.85 B |
| 3,644,482 | 2/1972 | Dexter et al. | 260/45.85 B |
| 3,745,145 | 7/1973 | Khattab et al. | 260/45.95 X |

OTHER PUBLICATIONS

Prochaska and Wypych, "Basic Principles of Thermal Degradation and Thermal Stabilization of Polyvinyl Chloride, Mathematical Model of the Action of PVC Thermal Stabilizers", Journal of Applied Polymer Science, vol. 21, 2113-2124 (1977).

*Primary Examiner*—Veronica P. Hoke
*Attorney, Agent, or Firm*—Richard A. Negin; Patrick L. Henry; Richard A. Anderson

[57] ABSTRACT

About equimolar ethylene/chlorotrifluoroethylene copolymer compositions are stabilized against thermal degradation by incorporating therein a stabilizing system comprising (a) a phosphite of an organic plyhydric phenol; (b) a salt of a carboxylic acid and a metal of Group II of the Periodic Table; and (c) an ester of a (4-hydroxy-5-alkylphenyl)alkanoic acid.

33 Claims, 1 Drawing Figure

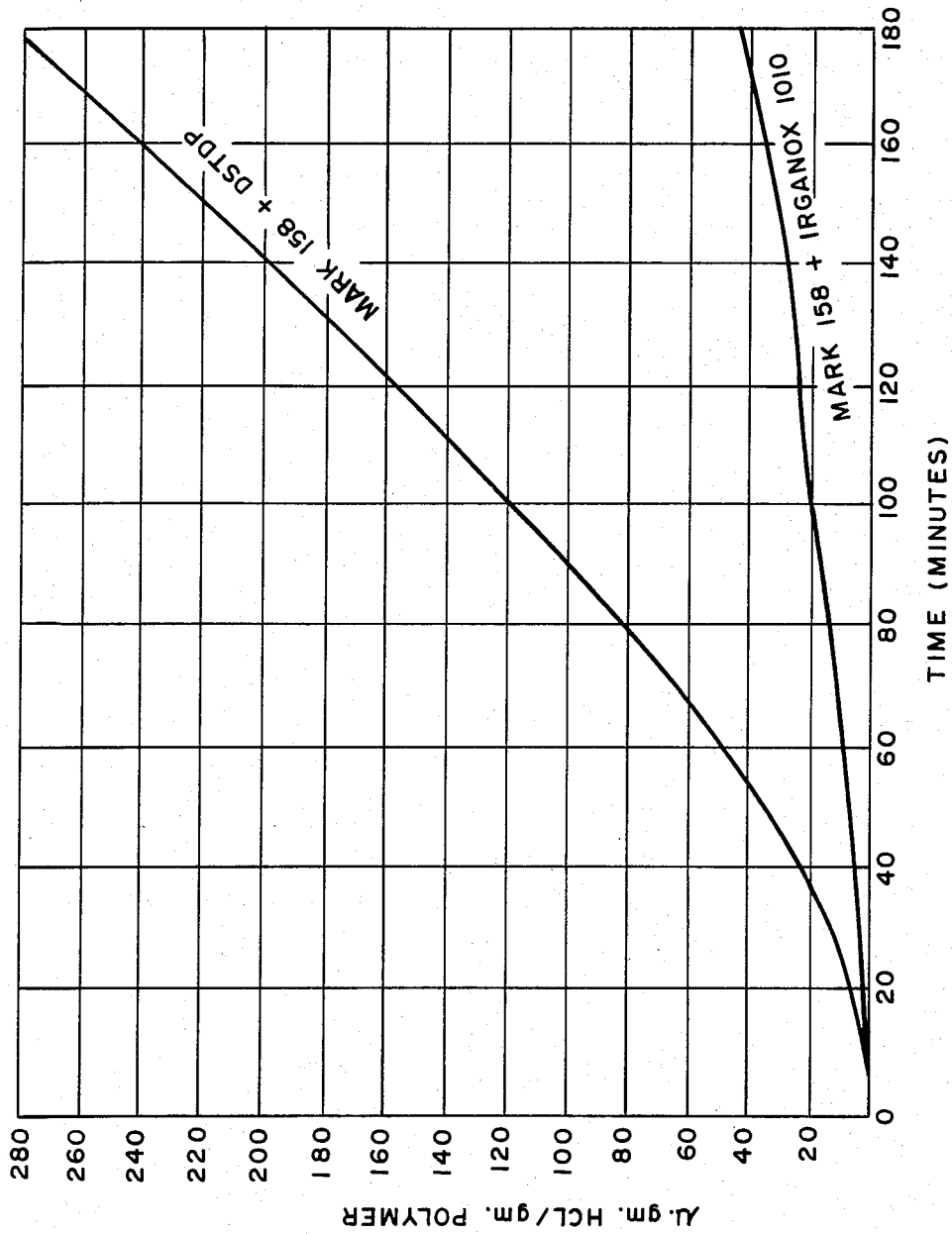

STABILIZED ETHYLENE/CHLOROTRIFLUOROETHYLENE COPOLYMER COMPOSITION

BACKGROUND OF THE INVENTION

This invention relates to stabilized, melt-processable ethylene/chlorotrifluoroethylene copolymer compositions, particularly to equimolar ethylene/chlorotrifluoroethylene copolymers, and more particularly, to a process for stabilizing equimolar ethylene/chlorotrifluoroethylene copolymers against degradation during fabrication and use at elevated temperatures.

Equimolar ethylene/chlorotrifluoroethylene copolymers exhibit outstanding mechanical, electrical and chemical properties at high temperatures. For example, equimolar ethylene/chlorotrifluoroethylene copolymers resist attack of most organic solvents at ambient as well as elevated temperatures, being only slightly soluble at 100°–150° C. in 2,5-dichlorobenzotrifluoride/benzonitrile or O-dichloro-benzene mixtures of 10:90 to 50:50 volume ratio. They are insoluble in bases and acids, including fuming nitric acid. These copolymers also possess high tensile strength and have melting points above about 200° C. and as high as about 260° C., which melting points are higher than those of the homopolymers of either ethylene as high as 130° C.) or chlorotrifluoroethylene (as high as 215° C.). Equimolar ethylene/chlorotrifluoroethylene copolymers also have outstanding electrical properties. For all of these advantageous properties, they are suitable for making useful articles, such as valves, gaskets, pipes, wire insulation, sheets or films for use in applications where their excellent mechanical, electrical and chemical properties can be used to advantage.

Equimolar ethylene/chlorotrifluoroethylene copolymers, due to their high melting points in excess of about 220° C., require melt fabrication temperatures of above about 250° C., usually within the range of between about 260° C. to 320° C. At these high temperatures, rapid degradation of the polymer occurs resulting in discoloration and loss of chemical, mechanical and electrical properties. In particular, degradation of these properties occurs during extrusion and injection molding operations.

U.S. Pat. No. 3,745,145 discloses equimolar ethylene/chlorotrifluoroethylene copolymer compositions which are stabilized against thermal degradation. The stabilizing system comprises: a phosphite of an organic polyhydric phenol; a salt of a carboxylic acid and a metal of Group II of the Periodic Table; and a thiodipropionic acid ester or alkali metal salt. This stabilizing system is satisfactory for most melt fabricating techniques used to process ethylene/chlorotrifluoroethylene copolymer compositions. There are various melt-fabricating processes, such as transfer molding and injection molding of very large parts, where the temperature and residence time of the process are more severe than encountered in most melt fabricating techniques. Therefore, it is desirable to have an improved stabilizing system for ethylene/chlorotrifluoroethylene composition to be processed at higher temperatures and for longer processing times than normally encountered.

U.S. Pat. Nos.: 3,644,482, 3,285,855, 3,255,136 and 3,244,650 are of interest.

SUMMARY OF THE INVENTION

The present invention is a stabilized ethylene/chlorotrifluoroethylene composition. There is intimately dispersed in the copolymer a stabilizer system comprising 0.01 to 3.0 percent by weight of the polymer of a transesterified reaction product of an organic polyhydric phenol having from 6 to about 50 carbon atoms and an organic phosphite triester free from phenolic hydroxy groups having up to about 60 carbon atoms obtained by transesterification of the phenol and phosphite at an elevated temperature sufficient to form a homogeneous mixture; 0.01 to 10.0 percent by weight of the polymer of a salt of a monocarboxylic acid having from about 6 to about 24 carbon atoms and a metal of Group II of the Periodic Table; and 0.01 to 3.0 percent by weight of the polymer of the ester of a (4-hydroxy-5-alkylphenyl)-alkanoic acid.

A preferred embodiment of the present invention comprises an equimolar ethylene-chlorotrifluoroethylene copolymer, 0.1 to 0.5 percent by weight of a phosphite of 4,4-n-butylidene-bis(6-tert butyl-m-cresol) or 1,1,3-tris(2-methyl-4-hydroxyl-5-tert-butylphenyl) butane, 0.1 to 0.3 percent by weight of zinc-2-ethylhexylate, and 0.1 to 0.5 percent of tetrakis [methylene 3-(3',5'-di-tert-butyl-4'-hydroxyphenyl)propionate].

BRIEF DESCRIPTION OF THE DRAWING

The FIGURE is a graph of micrograms (μ gm) of hydrogen chloride (HCl) emitted per gram of copolymer over a period of time when the copolymer is heated to 275° C. The graph compares the HCl emitted when using comparative stabilizer system, 3 parts by weight of the phosphite of 4,4-n-butylidene-bis-(6-tert-butyl-m-cresol) and 1 part by weight of zinc-2-ethylhexylate (Mark TM 158), and disterylthiodipropionate (DSTDP), versus the stabilizer system of the present invention Mark 158 and tetrakis[methylene 3-(3',5',-di-tert-butyl-4'-hydroxyphenyl)propionate] (Irganox TM 1010).

DESCRIPTION OF THE PREFERRED EMBODIMENTS

The present invention is a stabilized ethylene/chlorotrifluoroethylene composition. The stabilizer system is described in detail below. Concentrations of the various components of the stabilizer system are in weight percent based on the weight of the copolymer unless otherwise indicated.

For the purposes of the present invention, melt stability is based on the following criteria: change of melt index with time; change of melt index extrudate color and quality with time; and evolution of acid with time. The change in melt index and extrudate color and quality are generally measured at 275° C. and 300° C., and the evolution of acid is generally measured at 275° C. The change of melt index with time indicates a breakdown or cross-linking of the ethylene-chlorotrifluoroethylene copolymer chains. The change of color and quality further indicates that the degradation of the polymer chains is occuring with the possibility of side reactions. The quality of the extrudate is affected by gases formed during chain breakage and side reaction resulting in bubble formation. An unstable ethylene/chlorotrifluoroethylene can evolve hydrogen chloride and hydrogen fluoride upon thermal degradation.

The copolymers of ethylene and chlorotrifluoroethylene, which can be used in the composition of the present invention, are high molecular weight, normally solid, thermoplastic polymers containing from 40 to 60 mol percent of ethylene units in the molecule, and correspondingly 60 to 40 mol percent chlorotrifluoroethylene units. The melt index is preferably from about 1 to about 50, more preferably from 0.5 to 30, and most preferably from 1.0 to 25 grams/10 minutes. The melt index is measured in accordance with modified ASTM Test No. 1238, run at 275° C. under a piston load of 2160 grams. The copolymer has a melting point from about 200° C. to about 265° C. The processing temperatures are generally in the range from 240° C. to 320° C., and preferably 260° C. to 300° C.

The stabilizing compositions in accordance with the present invention are particularly advantageous for use in about equimolar ethylene/chlorotrifluoroethylene copolymers containing between about 45 and about 55 mol percent of ethylene units and having melting points above about 220° C.

These copolymers may be prepared by processes known to those skilled in the art, as described, for example, in Hanford U.S. Pat. No. 2,392,378, which shows copolymerization of ethylene with chlorotrifluoroethylene in a stirred aqueous medium at superatmospheric pressure using benzoyl peroxide as catalyst; in NUCLEONICS, September, 1964, pp. 72–74, disclosing formation of a high melting (237° C.) 1:1 alternating copolymer of ethylene and chlorotrifluoroethylene prepared using a radiation at 0° C.; or British Pat. No. 949,422, showing bulk copolymerization of ethylene with chlorotrifluoroethylene at temperatures between −80° to +50° C. using oxygen-activated alkyl boron catalyst; or Ragazzini et al. U.S. Pat. Nos. 3,371,076 and 3,501,446, respectively, relating to methods for making ethylene/chlorotrifluoroethylene copolymers using oxygen-activated boron-containing catalysts and to products obtained by that process. About equimolar ethylene/chlorotrifluoroethylene copolymers having a melting point above 200° C. can also be prepared by batchwise bulk copolymerization of the monomers at temperatures of about 0° C., say between about −20 to +20° C., at superatmospheric pressure in an agitator-equipped pressure vessel by charging the vessel with liquid chlorotrifluoroethylene monomer and bubbling gaseous ethylene into this monomer, using organic peroxide-type initiators, such as trichloroacetyl peroxide and, if desired, adding small amounts of chain transfer agents, such as chloroform or heptane. The desired copolymer product is obtained as a dispersion in the monomer.

The copolymer can contain nominal amounts of comonomers other than ethylene and chlorotrifluoroethylene, including propylene, isobutylene, vinyl fluoride, hexafluoropropylene, tetrafluoroethylene, vinylidene fluoride, perfluoro-vinyl ether, acrylic acid and alkyl ester, methacrylic acid and alkyl ester, perfluoro alkyl ethylene, etc.

The organic polyhydric phenols used to obtain the transesterified reaction product used in the polymer compositions of the present invention have the formula:

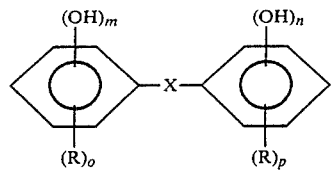

wherein X is selected from the group consisting of oxygen, sulfur, alkylene, alicyclidene, arylidene and mixed alkylenearylidene and alkylene-alicyclidene groups, wherein the aliphatic or cycloaliphatic portion of the molecule may be straight chain or branched chain, having from 1 to about 18 carbon atoms; wherein the R substituents, which may be the same or different, are independently selected from the group consisting of hydrogen and alkyl, straight or branched chain, having from 1 to about 18 carbon atoms; and wherein m and n are integers from 1 to 5, and o and p are integers from 0 to 4, with the proviso that the sums of m+o, and n+p may not exceed 5. The OH groups preferably are in ortho and/or para position to X.

Transesterified reaction products of organic polyhydric phenols and organic phosphite triesters suitable for use in the presently claimed invention are described, for example, in U.S. Pat. Nos. 3,244,650 and 3,255,136, both issued to Hecker et al. The description of these transesterification products given herein is principally based on that given in Hecker et al.'s U.S. Pat. No. 3,244,650.

As described in U.S. Patent No. 3,244,650, suitable polyhydric phenols include orcinol, catechol, resorcinol, p-octyl resorcinol, p-dodecyl resorcinol, p-octadecyl catechol, p-isooctyl-phloroglucinol, pyrogallol, hexa-hydroxy benzene, p-isohexyl-catechol, 2,6-ditertiary butyl resorcinol, 2,6-di-isopropyl phloroglucinol, methylenebis-(2,6-ditertiary butyl-m-cresol), methylenebis(2,6-ditertiary butyl phenol), 2,2-bis(4-hydroxy phenyl)propane, methylene-bis(p-cresol), 4,4'-thio-bis(3-methyl-6-tertiary butyl phenol), 2,2'-oxo-bis(4-dodecyl phenol), 2,2'-thio-bis(3-methyl-6-tertiary butyl phenol), 2,2 thio-bis-(4-methyl-6-tertiary butyl phenol), 2,6-diisooctyl resorcinol, (4,4'n-butylidene-bis-(2,4-butyl-5-methylphenol), 4,4'-benzylidene-bis-(2-t-butyl)-5-methylphenol), 2,2'-methylene-bis-(4-methyl-6-1'-methylcyclohexylphenol), 4,4'-cyclohexylidene-bis(2-t-butyl-phenol), 2,6-bis(2'hydroxy-3'-t-butyl-5'-methylbenzyl)-4-methylphenol, 4-octyl pyrogallol, and 3,5-ditertiary butyl catechol.

Especially preferred polyhydric phenols are 4,4'-n-butylidene-bis-(6-tert-butyl-m-cresol) and 1,1,3-tris(2-methyl-4-hydroxy-5-tert-butylphenyl)butane.

Organic phosphites suitable for making the transesterified reaction products of organic polyhydric phenol and organic phosphite triester used in the stabilizer compositions of the present invention are also described in U.S. Pat. No. 3,244,650. They can be any organic phosphite having the formula $(Ra)_3P$ wherein a is selected from the group consisting of oxygen, sulfur and mixtures thereof, and R is selected from the group consisting of aryl, alkyl, cycloalkyl, aryl-alkyl, alkylaryl and combinations thereof. The term "organic phosphite triester", as used herein, includes oxo, thio and mixed oxo-thio phosphites. For reasons of availability, the phosphite will not usually have more than 60 carbon atoms. Exemplary suitable phosphites include those listed in U.S. Pat. No. 3,244,650, i.e.

monophenyl di-2-ethyl hexyl phosphite, diphenyl mono-2-ethyl hexyl phosphite,
di-isooctyl monotolyl phosphite,
tri-2-ethyl hexyl phosphite,
phenyl dicyclohexyl phosphite,
phenyldiethyl phosphite,
triphenyl phosphite,
tricresyl phosphite
tri(dimethylphenyl) phosphite,
trioctadecyl phosphite,
triisooctyl phosphite,
tridodecyl phosphite,
isooctyl diphenyl phosphite,
diisooctyl phenyl phosphite,
tri(t-octylphenyl) phosphite,
tri(t-nonylphenyl) phosphite,
benzyl methyl isopropyl phosphite,
butyl dicresyl phosphite,
isooctyl di(octylphenyl) phosphite,
di(2-ethylhexyl)(isooctylphenyl) phosphite,
tri(2-cyclohexylphenyl) phosphite,
tri-alpha-naphthyl phosphite,
tri(phenylphenyl) phosphite,
tri(2-phenylethyl) phosphite,
tridodecyl thiophosphite,
tri-p-tert-butyl phenyl thiophosphite,
dodecyl thiodiphenyl phosphite, and
tert-butyl phenyl thio-di-2-ethylhexyl phosphite.

There is from 0.1 percent to 3.0 percent, and preferably from 0.1 percent to 0.5 percent, by weight of the polymer of the transesterification product. The most preferred transesterification product is the phosphite of 4,4-n-butylidene-bis-(6-tert-butyl-m-cresol).

The transesterified reaction products of organic polyhydric phenols and organic phosphite triesters free from phenolic hydroxyl groups may be obtained by heating together the phenol and phosphite ester, preferably at temperatures of from 100° C. to 200° C., if necessary under reflux. To expedite transesterification, it is preferred to add a small amount of an alkali or alkaline earth metal oxide, hydroxide or phenolate, in an amount of between about 0.05 percent to about 1 percent by weight. Although it is not necessary that transesterification be complete, it is believed that only the transesterification product is suitable for use in stabilizing about equimolar ethylene/chlorotrifluoroethylene copolymers during melt processing in accordance with the present invention because only they have sufficiently high boiling points to ensure their presence during fabrication by melt processing at temperatures of up to about 320° C. Usually, transesterification involving about ⅓ of the phosphite ester groups of the triphosphite and about ½ of the available phenol groups of the dihydric phenol on a mol for mol basis may be sufficient.

The second essential component of the stabilizer system of the present invention is a salt of a monocarboxylic acid having from about 6 to about 24 carbon atoms and a metal of Group II of the Periodic Table. The metal can, for example, be any one of zinc, calcium, cadmium, barium, magnesium, and strontium. The acid can be any organic monocarboxylic acid having from about 6 to about 24 carbon atoms which does not contain nitrogen. Suitable acids are also described in U.S. Pat. No. 3,244,650. As therein set forth, the aliphatic, aromatic, alicyclic and oxygen-containing heterocyclic organic acids are operable as a class. "Aliphatic acid" includes any open chain carboxylic acid, unsubstituted or substituted with unreactive groups such as halogens, sulfur or hydroxyl. "Alicyclic acid" includes any carboxylic acid having a non-aromatic ring optionally substituted by an unreactive substituent, such as halogens, hydroxyl groups or alkyl and alkyenyl radicals or other carboxylic ring structures. Suitable aromatic acids can be carboxylic or oxygen-containing heterocyclic and may be substituted by an unreactive ring substituent such as halogens, alkyl or alkenyl radicals and other saturated or aromatic rings condensed therewith. Suitable exemplary organic acids include those listed in U.S. Pat. No. 3,244,650, i.e. hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicyclic acid, naphthoic acid, 1-naphthalene acetic acid, orthobenzolyl benzoic acid, naphthenic acids derived from petroleum, abietic acid, dihydroabietic acid, hexanhydrobenzoic acid, and methyl furoic acid.

Organic zinc salts are preferred for use in the stabilizer compositions of the present invention, zinc-2-ethyl hexylate being a specific example of a preferred organic zinc salt. There is from 0.1 to 10 percent, and preferably 0.1 to 0.3 percent of the organic zinc salt. The most preferred organic zinc salt is zinc-2-ethylhexylate.

The third component of the stabilizer system is the ester of a (4-hydroxy-5-alkylphenyl)alkanoic acid. The ester has the formula:

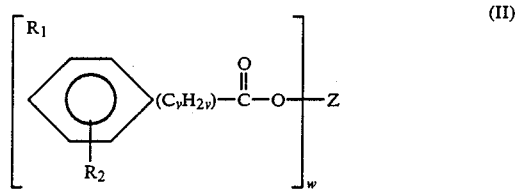

(II)

wherein $R_1$ is methyl, ethyl or an alpha-branched alkyl group of from 3' to 10 carbon atoms; $R_2$ is hydrogen, methyl, ethyl or an alpha-branched alkyl group of from 3 to 10 carbon atoms; v has a value of from 1 to 6; w has a value of from 2 to 6; Z is an aliphatic hydrocarbon of the formula:

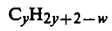

III in which y has a value of from 2 to 18 when w is 2 and a value of from 3 to 6 when n is greater than 2, the value of y in all cases being equal to or greater than that of w.

It will be observed that the compounds of the present invention exhibit one alkyl group ($R_1$) in a position ortho to the hydroxy group. A second like or different alkyl group ($R_2$) is optionally present either (a) in the other position ortho to the hydroxy group and (the 3-position) or (b) meta to the hydroxy group and para to the first alkyl group (the 2-position). These alkyl groups will be methyl, ethyl or when higher than ethyl, an α-branched alkyl group of from 3 to 10 carbon atoms. By the term "α-branched alkyl group" is intended one in which the carbon atom of the alkyl group which is bound to the phenyl group is also bound to at least two other carbon atoms of the alkyl group.

Thus the mono- or dialkylphenolic group includes for example 3,5-di-t-butyl-4-hydroxyphenyl, 3,5-dimethyl-4-hydroxyphenyl 3,5-di-isopropyl-4-hydroxyphenyl, 2,5-dimethyl,4-hydroxyphenyl, 2-methyl-4-hydroxy-5- t-butylphenyl, 2-methyl-4-hydroxy-5-isopropylphenyl, 3-methyl-4-hydroxy-5-t-butylphenyl, 3,5-diethyl-4-hydroxyphenyl and the like. Preferred phenolic groups are those having at least one branched group such as isopropyl, t-butyl or the like, in a position ortho to the hydroxy group.

The mono- or dialkyl-4-hydroxyphenyl group is bound to an alkanoyl unit of from 2 to 7 carbon atoms. The hydrocarbon portion of this alkanoyl unit is represented by $—(C_vH_{2v})—$ and may be of a straight or, when $v$ is greater than 1, branched chain. A preferred alkanoyl group is the 3-propionyl group.

Two or more (as determined by the integer w) of these mono- or dialkylphenylalkanoyl groups are then bound through a like number of oxygen atoms to the hydrocarbon residue of a polyol. The polyol from which these esters are derived will thus consist of the straight or branched chain hydrocarbon residue of the formula $C_yH_{2y+2-w}$ and a number of hydroxy groups equal to w. When w is two, i.e. the polyol is a diol, this hydrocarbon residue will have from 2 to 18 carbon atoms. When w is greater than two, i.e. the polyol is a triol, tetrol, pentol or hexol, the hydrocarbon residual will have from 3 to 6 carbon atoms. In all cases, the number of hydroxy groups and the resulting number of alkylphenylalkanoyloxy groups (as designated by w) will be equal to or less than the number of carbon atoms (y) in the hydrocarbon residue; i.e., since each carbon atom of the hydrocarbon residue can bear only one hydroxy group, y is equal to or greater than w.

Representative esters which can be used in the stabilizer system of the composition of the present invention include but are not limited to the following esters disclosed in U.S. Pat. No. 3,644,482: Esters characterized by the formula:

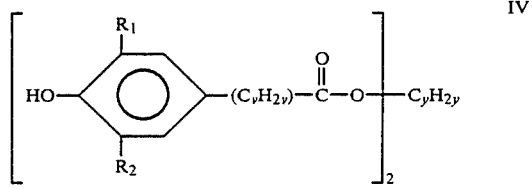

IV wherein each $R_1$ and $R_2$ is methyl, ethyl or an alpha-branched alkyl group of from 3 to 6 carbon atoms. Preferably, each of $R_1$ and $R_2$ is tertiary butyl. More preferably, the ester is a 3-(3,5-di-t-butyl-4-hydroxyphenyl)propionic acid diester of a diol. The diols can include: ethylene glycol; propylene glycol; 1,3-propanediol; 1,4-butanediol, 1,5-pentanediol; neopentyl glycol; 1,6-hexanediol; 2-methyl-1,4-pentanediol; 2,2,4-trimethyl-1,3 pentanediol; 2,4-dimethyl-2,4-pentanediol; 2,4,4-trimethyl-1,6,hexanediol; 1,8-octanediol; 1,9-nonanediol; 1,10-decanediol; 1,2,-dodecanediol; 1,12-octadecanediol and 1,18-octadecanediol. Specifically preferred esters include: ethylene glycol bis[3-(3,5-di-t-butyl-4-hydroxyphenyl)-propionate]; 1,2-propylene glycol bis-[3,(3,5-di-t-butyl-4-hydroxyphenyl) propionate], neopentylglycol bis-[3,(3,5-di-t-butyl-4-hydroxyphenyl)propionate]; 1,6-hexanediol bis-[3,5-di-t-butyl-4-hydroxyphenyl)propionate]; and 1,9-nonanediol bis-[3,(3,5-di-t-butyl-4-hydroxyphenyl) propionate].

Representative esters which can be used in the stabilizer system of the present invention include esters when Z of the formula II has the formula: $C_yH_{2y+2-w}$ where y has a value of from 3 to 6, and the value of y is equal to or greater than the value of w. Preferably, each $R_1$ and $R_2$ of formula II is tertiary butyl. More preferably the esters include: pentaerythritol tetrakis-[3-(3,5 di-t-butyl-4-hydroxyphenyl) propionate]; 1,1,1-trimethylolethane tris [3,(3,5-di-t-butyl-4-hydroxyphenyl)-propionate]; 1,1,1-trimethylopropane tris [3,(3,5-di-t-butyl-4-hyroxyphenyl)propionate]; glycerine tris [3-(3,5-di-t-butyl-4-hydroxyphenyl) propionate]; and sorbitol hexakis [3-(3,5-di-t-butyl-4-hydroxphenyl)propionate].

Representative esters which can be used in the stabilizer system of the present invention also include pentaerythritol tetrakis [3-(3-methyl-4-hydroxy-5-t-butylphenyl) propionate] and pentaerythritol tetrakis [3-(3,5-dimethyl-4-hydroxyphenyl)propionate].

The composition of the present invention contains from 0.1 percent to 3.0 percent, and preferably 0.1 percent to 0.5 percent, by weight of the polymer of the ester. The most preferred ester is tetrakis [methylene 3-(3',5'di-tert-butyl-4'-hydroxyphenyl)propionate].

A preferred stabilized ethylene/chlorotrifluoroethylene composition contains 0.1 to 0.5 percent by weight of a phosphite of 4,4'-n-butylidene-bis(6-tert-butyl-m-cresol) or 1,1,3-tris-(2-methyl-4-hydroxyl-5-tert-butylphenyl)butane, 0.1 to 0.3 percent by weight of zinc-2-ethylhexylate, and 0.1 to 0.5 percent of tetrakis [methylene 3-(3',5'-di-tert-butyl4'-hydroxyphenyl)propionate].

The stabilizer system can be dry blended or solvent blended into the ethylene/chlorotriflurethylene. In the examples to follow the stabilizer was both dry blended and solvent blended. When the materials were dry blended, stabilizer and polymer both in powder form were mixed in a container on the rolls of a ball mill. When the materials were solvent blended, the amount of stabilizer necessary to stabilize one pound of polymer was dissolved in 200 cc of trichlorofluoromethane. This was then mixed with polymer powder on a ball mill. It is to be recognized that this invention is not limited by the method of blending, and that other methods to blend stabilizers into polymers can be used.

Several examples are set forth below to illustrate the nature of the invention and the manner of carrying it out. However, the invention should not be considered as being limited to the details thereof.

EXAMPLES 1–7

In Examples 1–7, a blend of 3 parts by weight of the phosphite of 4,4-n-butylidene-bis-(6-tert-butyl-m-cresol) and 1 part by weight of zinc-2-ethylhexylate manufactured by Argus Chemical Corp. as Mark ™ 158, and tetrakis[methylene 3-(3',5'-di-tert-butyl-4'-hydroxyphenyl)propionate], manufactured by Ciba Geigy Corp. as Irganox ™ 1010, were used as the stabilizing system. The Irganox 1010 is also identified by the name tetrakis[methylene(3,5-di-tert-butyl-4-hydroxyhydrocinnamate)]methane. This stabilizing system was blended for 24 hours on a ball mill with ethylene/chlorotrifluoroethylene copolymer powder, manufactured by Allied Chemical Corp. as Halar ® ECTFE, having a density of 1.68 gm/ml, a melt index of 1.0 to 3 g/10 minutes measured according to ASTM D-1238 run at 275° C., under a piston load of 2160 grams, and about 49 to 51 mol percent ethylene and a corresponding amount of chlorotrifluoroethylene monomer. A seven gram sample of the composition was run on a melt index device in the manner described in ASTM D-1238 at a load of 2160 grams for up to 3 hours at 275° C. to 300° C. The extrudate was examined for color, bubbles and melt index. A comparative stabilizing system of the Mark 158 and disterylthiodipropionate (DSTDP) was used. The color rating is: 1-Excellent; 2-Good; 3-Acceptable; and 4-Unacceptable. Excellent indicates that the extrudate is white, and Unacceptable is brown or black. Good and Acceptable are indications of color, with Good being lighter than Acceptable. The color stability results are summarized in Table I below. The concentrations are percents by weight of the stabilized ECTFE composition.

TABLE I

| | Stabilizer Concentration | | | M.I. | Color Rating @ | | | |
|---|---|---|---|---|---|---|---|---|
| | Mark 158 | Irganox 1010 | DSTDP | Temp °C. | 1 hr | 2 hrs | 2.5 hrs | 3 hrs |
| Comp 1 | .3 | — | .15 | 275 | 2 | 4 | — | 4 |
| Ex 1 | .3 | .3 | — | 275 | 1 | 2 | — | 2 |
| Comp 2 | .3 | — | .15 | 300 | 2 | 4 | — | — |
| Ex 2 | .3 | .3 | — | 300 | 1 | 2 | — | — |
| Ex 3 | 1 | 1 | — | — | — | 2 | 3 | 3 |
| Ex 4 | 1 | .75 | — | — | — | 3 | 4 | 4 |
| Ex 5 | 1 | .5 | — | — | — | 3 | 4 | — |
| Ex 6 | .5 | .5 | — | — | — | 3 | 4 | — |
| Ex 7 | .3 | .3 | — | — | — | 3 | 4 | — |

The stabilizer system of the present invention, Examples 1 and 2 had equal melt index values and freedom from bubbles as Comparatives 1 and 2. The stabilizer system of the present invention resulted in better extrudate color as indicated by the above comparison. The compositions of Comparatives 1 and 2 were chosen based on the disclosure in U.S. Pat. No. 3,745,145 at Column 8 and Table V.

The effect of varying concentration of the Mark 158 and Irganox 1010 is illustrated in Examples 3-7. All had acceptable color ratings after 2 hours at 300° C. It was found that bubbles began to appear at concentrations higher than 0.3 percent of the Mark 158 and 0.3 percent of the Irganox, although the color was Acceptable and Good as indicated. It is, therefore, preferred to use 0.3 percent Mark 158 and 0.3 percent Irganox 1010 in an ethylene/chlorotrifluoroethylene composition.

EXAMPLES 8-11

In Examples 8-11, the same ethylene/chlorotrifluoroethylene (ECTFE) as used in Examples 1-7 was stabililzed. The stabilizer system of the present invention was Irganox 1010 and Mark 158. The comparative stabilizer system was Mark 158 and DSTDP. The Irganox 1010, Mark 158 and DSTDP are described in Examples 1-7. The stabilizer system was blended into the ECTFE either on a ball mill for 24 hours, or by solvent blending. The stabilizing system was dissolved in trichlorofluoromethane and blended with ECTFE powder on a ball mill. The solvent was removed by drying at less than 100° C. Seven gram samples of the composition were run on a melt index device in the manner described in ASTM D-1238 at a load of 2160 grams for up to 3 hours at 275° C. The color was rated according to the method of Example 1-7. The color ratings and melt index values in grams/10 minutes for ball mill blended samples are summarized in Table II below, and solvent blended samples are summarized in Table III below. The concentrations are percents by weight of the stabilized ECTFE composition.

TABLE II

| | Stabilizer Concentration | | | Color Rating Melt Index | | | | | |
|---|---|---|---|---|---|---|---|---|---|
| | Mark 158 | Irganox 1010 | DSTDP | 5 min | .5 hr | 1 hr | 1.5 hr | 2 hrs | 3 hrs |
| Comp. 3 | .3 | — | .15 | 1 | 1 | 2 | 3 | 4 | 4 |
| | | | | 2.49 | 2.33 | 2.52 | 2.42 | 2.59 | 2.53 |
| Ex. 8 | 1.0 | 1.0 | — | 2 | 2 | 2 | | | |
| | | | | 1.26 | 1.22 | 1.23 | | | |
| Ex. 9 | .3 | .3 | — | 1 | 1 | 1 | — | 2 | 2 |

TABLE III

| | Stabilizer Concentration | | | Color Rating Melt Index | | | | | |
|---|---|---|---|---|---|---|---|---|---|
| | Mark 158 | Irganox 1010 | DSTDP | 5 min | .5 hr | 1 hr | 1.5 hr | 2 hrs | 3 hrs |
| Comp. 4 | .3 | — | .15 | 1 | 1 | 2 | 3 | 4 | 4 |
| | | | | 2.7 | 2.62 | 2.52 | 2.5 | — | 3 |
| Ex. 10 | 1.0 | 1.0 | — | 2 | 2 | 2 | | | |
| | | | | 1.47 | 1.28 | 1.15 | | | |
| Ex. 11 | .3 | .3 | — | 2 | 2 | 2 | 2 | — | 2 |
| | | | | 1.12 | 1.05 | 1.05 | 1.05 | — | 1.05 |

No bubbles were observed in the extrudate of any of the Example or Comparative compositions. Variations in melt index from example to example result from the ECTFE resin used. The melt indices for all of the Example and Comparative compositions remained relatively constant. That is, there was little melt instability with regard to the melt index increasing. The color stability of both the Example and Comparative compositions was Excellent or Good at one hour or less. The color stability of the Example compositions was better at times longer than one hour.

EXAMPLES 12-13

Examples 12-13 are blends of stabilizer systems and the ECTFE described in Examples 1-7. The stabilizers were blended on a ball mill for 24 hours. Stabilizer systems of the present invention are Irganox 1010 and Mark 158, and Irganox 1010 and Mark 1259A. The comparative stabilizer system was Mark 158 and DSTDP. The Irganox 1010, Mark 158 and DSTDP are described in Examples 1-7. The Mark 1259A is a phosphite ester of a hindered phenol. A seven gram sample of the composition was run on a melt index device in the manner described in ASTM D-1238 at a load of 2160 grams for up to 9000 seconds at 300° C. The color was rated according to the method of Examples 1–7. The color ratings and melt index values in grams/10 minutes are summarized in Table IV below. The concentrations are precents by weight of the stabilized ECTFE composition.

TABLE IV

|  | Comp 5 | Ex 12 | Ex 13 |
|---|---|---|---|
| Mark 158 | .3 | .3 | — |
| Mark 1259A | — | — | .3 |
| Irganox 1010 | — | .3 | .3 |
| DSTDP | .15 | — | — |
| Color Rating Melt Index |  |  |  |
| 1000 sec. | 1 | 1 | — |
|  | 4.72 | 4.68 | — |
| 2000 sec. | 2 | 1 | — |
|  | 4.49 | — | — |
| 3000 sec. | 2 | 1 | 1 |
|  | 4.39 | — | 4.6 |
| 3600 sec. | 2 | 1 | — |
|  | 4.38 | — | — |
| 4000 sec. | 3 | 2 | — |
|  | 3.98 | — | — |
| 5000 sec. | 4 | 2 | 3 |
|  | 4.41 | 4.45 | 4.4 |
| 6000 sec. | 4 | 2 | 4 |
|  | 4.37 | 4.47 | 4.4 |
| 7200 sec. | — | 3 | 4 |
|  | — | — | 4.7 |
| 9000 sec. | — | 4 | — |
|  | — | — | — |

The ECTFE copolymer resin stabilized with Mark 158 and Irganox 1010, as shown in Table IV, is most preferred.

EXAMPLE 14

In this Example, ECTFE copolymer of the type described in Example 1 was stabilized with 1 percent Mark 158 and 1 percent Irganox 1010. The Mark 158 and Irganox 1010 are described in Examples 1–7. The stabilized copolymer was heated to 275° C. and the amount of hydrogen chloride was measured by ion chromotographic techniques. A comparative was made with 0.3 percent Mark 158 and 0.15 percent DSTDP. The results are shown in the FIGURE. The stabilizer system of the present invention is more effective in suppressing the evolution of hydrogen chloride than the comparative stabilizer system.

The ion chromatographic (IC) procedure was to weigh a five gram sample into a platinum boat. The boat was transferred to a combustion tube preheated to 275° C. ±10° C. using two split-combustion furnaces. The samples were heated under a nitrogen atmosphere and the acidic off gases were collected at 15 minute intervals in 30 to 40 milliliters of 0.0054 M $NaHCO_3$ eluent (ph 10.4). The individual solutions were then diluted up to 50 milliliters in polypropylene volumetric flasks. One hundred microliter samples were then analyzed. A Model 14 Ion Chromatograph with a 3×150 mm precolumn, a 3×500 separator column, and a 650 mm suppressor column was used.

While exemplary embodiments of the invention have been described, the true scope of the invention is to be determined from the following claims:

What is claimed is:

1. A copolymer composition having improved thermal stability which comprises an admixture of an ethylene/chlorotrifluoroethylene copolymer containing about 40 to about 60 mol percent of ethylene units and about 40 to about 60 mol percent of chlorotrifluoroethylene units, and
   (a) 0.01 percent to 3 percent by weight of the polymer of a transesterified reaction product obtained from an organic polyhydric phenol selected from the group consisting of 1,1,3-tri(2-methyl-4-hydroxy-5-tert-butyl phenyl)butane and the phenol of the formula

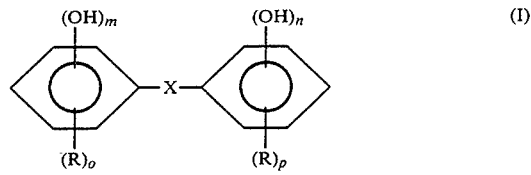

wherein X is selected from the group consisting of oxygen, sulfur, alkylene, alicyclidene, arylidene and mixed alkylene-arylidene and alkylene-alicyclidene groups, wherein the aliphatic or cycloaliphatic portion of the molecule may be straight chain or branched chain, having from 1 to about 18 carbon atoms; wherein the R substituents, which may be the same or different, are independently selected from the group consisting of hydrogen and alkyl, straight or branched chain, having from 1 to about 18 carbon atoms; and wherein m and n are integers from 1 to 5, and o and p are integers from 0 to 4, with the proviso that the sums of m+o, and n+p may not exceed 5, and an organic phosphite triester free from phenolic hydroxyl groups having up to about 60 carbon atoms obtained by transesterification of the phenol and phosphite at an elevated temperature sufficient to form a homogeneous mixture;
   (b) 0.01 percent to 10.0 percent by weight of the polymer of a salt of a monocarboxylic acid having from 6 to about 24 carbon atoms and a metal of Group II of the Periodic Table; and
   (c) 0.01 percent to 3.0 percent by weight of the polymer of the ester of a (4-hydroxy-5-alkylphenyl)alkanoic acid, the ester having the formula:

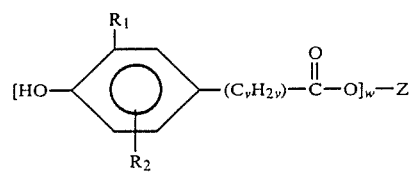

wherein
   $R_1$ is methyl, ethyl or an alpha-branched group of from 3 to 10 carbon atoms;
   $R_2$ is hydrogen, methyl, ethyl or an alpha-branched alkyl group of from 3 to 10 carbon atoms;
   v has a value of from 1 to 6;
   w has a value of from 2 to 6; and
   Z is an aliphatic hydrocarbon of the formula:

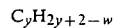

in which y has a value of from 2 to 18 when w is 2 and a value of from 3 to 6 when w is greater than 2, the value of y in all cases being equal to or greater than that of w.

2. The composition of claim 1 wherein the copolymer is an about equimolar ethylene/chlorotrifluoroethylene copolymer.

3. The composition of claim 1 wherein the salt of a monocarboxylic acid is a zinc salt.

4. A composition according to claim 1 wherein w is 2 and Z is a divalent aliphatic hydrocarbon of the formula —C$_2$H$_{2y}$— in which y has a value of from 2 to 18.

5. A composition according to claim 4 wherein the ester is characterized by the formula:

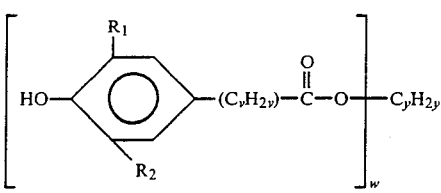

wherein each of R$_1$ and R$_2$ is methyl, ethyl or an alpha-branched alkyl group of from 3 to 6 carbon atoms.

6. A compound according to claim 5 wherein each of R$_1$ and R$_2$ is tertiary butyl.

7. The composition of claim 1 wherein the transesterified reaction product is obtained from an organic phosphite having the formula (Ra)$_3$P wherein a is selected from the group consisting of oxygen, sulfur and mixtures thereof, and R is selected from the group consisting of aryl, alkyl, cycloakyl, aryl-alkyl and alkyl-aryl.

8. The composition of claims 6 or 7 wherein the salt of a monocarboxylic acid is a zinc salt.

9. The composition of claim 8 wherein the copolymer is an about equimolar ethylene/chlorotrifluoroethylene copolymer.

10. The composition of claims 6 or 7 wherein the copolymer is an about equimolar ethylene/chlorotrifluoroethylene copolymer.

11. The composition according to claim 10 wherein the ester is a 3-(3,5-di-t-butyl-4-hydroxyphenyl)propionic acid diester of a diol selected from the group consisting of ethylene glycol; propylene glycol; 1,3-propanediol; 1,4-butanediol; 1,5-pentanediol; neopentyl glycol; 1,6-hexanediol; 2,-methyl-1,4-pentanediol; 2,2,4-trimethyl-1,3-pentanediol; 2,4-dimethyl-2,4-pentanediol; 2,4,4-trimethyl-1,6-hexanediol; 1,8-octanediol; 1,9-nonanediol; 1,10-decanediol; 1,2-dodecanediol; 1,12-octadecanediol and 1,18-octadecanediol.

12. The composition according to claim 10 wherein the ester is ethylene glycol bis[3-(3,5-di-t-butyl-4-hydroxyphenyl)-propionate].

13. The composition according to claim 10 wherein the ester is 1,2-propylene glycol bis-[3(3,5-di-t-butyl-4-hydroxyphenyl)propionate].

14. The composition according to claim 10 wherein the ester is neopentyl-glycol bis-[3(3,5-di-t-butyl-4-hydroxyphenyl)propionate].

15. The composition according to claim 10 wherein the ester is 1,6-hexane-diol bis-[3(3,5-di-t butyl-4-hydroxyphenyl)propionate].

16. The composition according to claim 10 wherein the ester is 1,9-nonanediol bis-[3(3,5- di-t-butyl-4-hydroxyphenyl)propionate].

17. A compound according to claim 1 wherein w has a value of from 3 to 6 and Z is an aliphatic hydrocarbon of the formula:

C$_y$H$_{2y+2-w}$ in which y has a value of from 3 to 6, the value of y being equal to or greater than the value of w.

18. A composition according to claim 17 wherein each of R$_1$ and R$_2$ is tertiary butyl.

19. A composition according to claim 18 where the ester is tetrakis[methylene 3-(3',5'-di-t-butyl-4-hydroxyphenyl)propionate].

20. A composition according to claim 18 where the ester is 1,1,1-trimethylolethane tris[3-(3,5-di-t-butyl-4'-hydroxyphenyl)propionate].

21. A composition according to claim 18 where the ester is 1,1,1-trimethylolpropane tris[3-(3,5-di-t-butyl-4'-hydroxyphenyl)propionate].

22. A composition according to claim 18 where the ester is glycerine tris[3-(3,5-di-t-butyl-4-hydroxyphenyl)propionate].

23. A composition according to claim 18 where the ester is sorbitol hexakis[3-(3,5-di-t-butyl-4-hydroxyphenyl)propionate].

24. A composition according to claim 17 characterized by the formula:

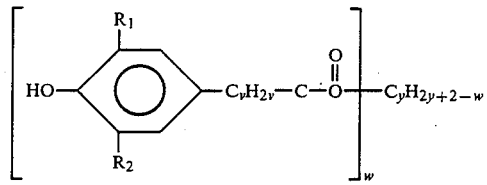

wherein each of R$_1$ and R$_2$ is methyl, ethyl or an alpha-branched alkyl group of from 3 to 6 carbon atoms.

25. A composition according to claim 24 where the ester is pentaerythritol tetrakis[3-(3-methyl-4-hydroxy-5-t-butylphenyl)propionate].

26. A composition according to claim 24 where the ester is pentaerythritol tetrakis[3-(3,5-dimethyl-4-hydroxyphenyl)propionate].

27. The composition of claim 1 wherein the transesterified reaction product is a phosphite of 4,4'-n-butylidene-bis(6-tert-butyl-m-cresol) or 1,1,3-tris(2-methyl-4-hydroxy-5-tert-butylphenyl)butane.

28. The compositon of claim 18 wherein the salt of a monocarboxylic acid is a zinc salt.

29. The composition of claim 28 further comprising tetrakis[methylene 3-(3',5'-di-tert-butyl4'-hydroxyphenyl)propionate].

30. The composition of claim 1 wherein the transesterified reaction product is a phosphite of 4,4'-n-butylidene-bis(6-tert-butyl-m-cresol) or 1,1,3-tris(2-methyl-4-hydroxy-5-tert-butylphenyl)butane, wherein the salt of a monocarboxylic acid is zinc-2-ethylhexylate, and wherein the ester is tetrakis[methylene 3-(3',5'-di-tert-butyl-4'-hydroxyphenyl) propionate].

31. The composition of claims 29 or 30 wherein the copolymer is an about equimolar ethylene/chlorotrifluoroethylene copolymer.

32. The composition as recited in claim 1 containing 0.1 percent to 0.5 percent by weight of a phosphite of 4,4'-n-butylidene-bis(6-tert-butyl-m-cresol) or 1,1,3-tris(2-methyl-4-hydroxyl-5-tert-butylphenyl)butane, 0.1 percent to 0.3 percent by weight of zinc-2-ethylhexylate, and 0.1 percent to 0.5 percent of tetrakis[methylene 3-(3',5'-di-tert-butyl-4'-hydroxyphenyl)propionate].

33. The composition of claim 32 wherein the copolymer is an about equimolar ethylene/chlorofluoroethylene copolymer.

* * * * *